United States Patent [19]

Blanding

[11] Patent Number: 5,124,969
[45] Date of Patent: Jun. 23, 1992

[54] HOUSING MEANS FOR AN AUTOMATED DATA LIBRARY

[75] Inventor: Douglass L. Blanding, Rochester, N.Y.

[73] Assignee: Eastman Kodak Company, Rochester, N.Y.

[21] Appl. No.: 508,036

[22] Filed: Apr. 10, 1990

[51] Int. Cl.$^5$ .................. G11B 17/26; G11B 5/48
[52] U.S. Cl. .................. 369/75.1; 369/34; 369/36; 369/194; 360/99.06
[58] Field of Search ............ 369/75.1, 34, 36, 178, 369/191, 194; 312/265.1, 265.2, 265.3, 265.4, 272, 272.5, 285, 350, 15, 18, 223, 306; 360/98.06, 99.06

[56] References Cited

U.S. PATENT DOCUMENTS

| | | | |
|---|---|---|---|
| 274,275 | 3/1883 | Clock | 312/306 |
| 2,781,037 | 2/1957 | Vuncannon | 312/272 |
| 3,075,818 | 1/1963 | Fay | 312/265.4 |
| 3,966,285 | 6/1976 | Porch | 312/265.4 |
| 4,286,790 | 9/1981 | Siryj | 369/36 |
| 4,338,485 | 7/1982 | Fullenkamp | 312/223 |
| 4,502,133 | 2/1985 | Siryj | 369/36 |
| 4,504,936 | 3/1985 | Faber . | |
| 4,608,679 | 8/1986 | Rudy . | |
| 4,614,474 | 11/1986 | Sudo . | |
| 4,675,856 | 6/1987 | Rudy | 369/34 |
| 4,787,074 | 11/1988 | Deck . | |
| 4,817,070 | 3/1989 | Hug | 369/36 |
| 4,817,071 | 3/1989 | Carlson . | |
| 4,853,916 | 8/1989 | Tomita | 369/36 |
| 4,973,110 | 11/1990 | Nyquist | 312/265.2 |

FOREIGN PATENT DOCUMENTS

| | | | |
|---|---|---|---|
| 0154358 | 6/1989 | Japan | 369/191 |
| 815918 | 7/1959 | United Kingdom | 312/306 |
| 2072494 | 10/1981 | United Kingdom | 312/265.1 |

Primary Examiner—Stuart S. Levy
Assistant Examiner—Joseph A. Rhoa
Attorney, Agent, or Firm—Robert L. Randall

[57] ABSTRACT

A housing for an automated data library which is a substantially rigid lightweight structure providing accurate location of the components therein. The housing structure comprises a plurality of longitudinally extending members disposed about and parallel to the central transfer shaftway and the storage bay areas, with at least one of the longitudinally extending members being formed as a rigid tubular member and the remaining longitudinally extending members being generally channel-shaped and disposed at the corners of the housing parallel with the shaftway and adjacent the open bay areas. A pair of closure plates are connected to and close the ends of the longitudinally extending members. A plurality of gusset plates join the adjacent ends of the longitudinally extending members and the periphery of the closure plates and leave a major portion of the shaftway and the bay area accessible between the longitudinally extending members.

2 Claims, 2 Drawing Sheets

HOUSING MEANS FOR AN AUTOMATED DATA LIBRARY

RELATED APPLICATIONS

The present invention relates to an improved automated data library and is related to the improvements disclosed and claimed in U.S. Pat. No. 5,060,211, Transport Drive and Support Means for an Automated Data Library, filed in my name, and Ser. No. 507,940, Media Drive for an Automated Data Library, and U.S. Pat. No. 5,065,379, Media Insertion Means for an Automated Data Library, both filed in the names of John J. Ellis and Stephen P. Smith, all filed on even date herewith.

BACKGROUND OF THE INVENTION

Field of the Invention

The present invention is directed to apparatus for the storage and retrieval of data and information. More particularly, it relates to improvements in a housing for an apparatus for transporting information storage disks, for example, magnetic, optic and magneto-optic storage disks, in a storage and retrieval device commonly referred to as an automated disk library.

Automated disk libraries, also known as "jukeboxes", are known in the art for storing and accessing a large number of data storage disks. Examples of such libraries are those disclosed in U.S. Pat. Nos. 4,286,790, 4,502,133, 4,504,936, 4,608,679, 4,614,474, 4,787,074 and 4,817,071. In such libraries, each information storage disk is housed in a protective cartridge or carrier which holds the disk and permits disk handling while permitting accessibility to the disk for data recording and/or retrieval. The disk carriers, with the associated disks, are supported by one or more storage racks which are arranged to support the disk and disk carriers in closely spaced parallel planes, for example, one above the other with the disks being disposed horizontally. Such automated disk libraries commonly include one or more disk drives for recording and/or retrieving information to or from a disk, as well as a disk carrier transport mechanism for transporting a selected carrier and disk between the storage location and the disk drive unit.

A necessary attribute of automated disk libraries is the ability to reliably transfer the disk from the storage rack to the transport means to the disk drive and back again. It is thus necessary that the transport means be repeatably and accurately aligned with the various stations that are addressed so that each disk is accurately aligned with the transport means, the storage station, or the disk drive, respectively, so that the transfer of the disk is repeatably and consistently reliable. To accomplish this repeatably accurate placement of the transport means, the transport means must be accurately located within the assembly and the accurate location must be the same for all positions of the transport means within the assembly. This accurate positioning must be with respect to all the three spatial dimensions, i.e., along the x-axis, the y-axis and the z-axis, as well as with respect to rotation of the transport means about each of the axis, i.e., rotation with respect to the x-axis, $\Theta_x$, with respect to rotation about the y-axis, $\Theta_y$, and rotation about the z-axis, $\Theta_z$.

In order to achieve the accurate and repeatable location of the transport member with respect to the various locations within the assembly, prior art automated disk libraries have been over-designed and overbuilt using expensive high-precision components that are costly in both size, weight and price to achieve the locating accuracy and repeatability necessary. Although the prior art automated disk libraries accomplish the desired result, they are heavy, oversized, and expensive, limiting their usefulness and acceptability. An example of this is seen in the transport mechanism locating means which consists of a pair of long, straight, round steel bars extending the length or height of the library. The transport mechanism is provided with two pairs of linear bushings which ride on the bars. The difficulties with such an arrangement include the necessity of utilizing high-precision bars that have the same diameter along the full length of the assembly. If the bars are not the same diameter throughout their length, the transport mechanism is too loose in some locations and too tight in others, interfering with proper operation and movement of the transport. Moreover, the linear bushings used must be of high precision and thus costly. Additional difficulties are found in the fact that the bushings must be collinear between the two riding the same bar. If they are not collinear, binding will occur, interfering with the operation of the entire automated disk library. In order to achieve collinearity it is necessary to use precision bushings and to accurately align them on the transport mechanism adding to the cost of the overall assembly. A further consideration of the prior art automated disk libraries is the fact that the use of the long steel bars as the guide rails for the transport mechanism in conjunction with the bushings prevents the support of the rails mid-span. Thus, transverse displacement of the rails and the resulting misalignment of the transport mechanism occurs because of the transverse loads applied to or by the transport mechanism as it is moved along the rails. As a result, heavier rods than would otherwise be expected must be used. Again, this adds to the cost and weight of the automated disk library.

While automated disk libraries of the prior art have been both bulky, heavy, and expensive, as well as expensive to operate and maintain, they have been constructed with housings that have not provided the requisite structural rigidity to prevent distortion of the assembly during manufacture, shipment and operation. As a result, the reliability and repeatability of the operation of the prior art automated disk libraries have been less than that necessary to gain wide market acceptance.

It will thus be seen that the provision of an automated disk library with a housing which provides the necessary rigidity and accuracy of positioning of the transport mechanism with respect to the storage bays and the disk drives without the attendant cost, bulk and weight of the prior art devices would be desirable from both cost and space considerations.

SUMMARY OF THE INVENTION

Accordingly, the present invention provides an automatic data library assembly comprising a plurality of storage means each arranged to accept and store a data storage member, a reading device arranged to retrieve data from a data storage member, and transport means arranged to selectively transfer data storage members between the storage means and the reading device. A housing is provided for the assembly forming a generally centrally disposed shaftway accommodating the movement of said transport means and at least one generally open bay area opening into and extending along the shaftway, with the bay area being arranged to locate the plurality of storage means and the reading device therein for access thereto by the transport means. The improvement comprises means forming the housing as a substantially rigid lightweight structure providing accurate location of the components therein. The housing structure comprises a plurality of longitudinally extending members disposed about and parallel to the shaftway and the bay area, with at least one of the longitudinally extending members being formed as a rigid tubular member and the remaining longitudinally extending members being generally channel-shaped and disposed at the corners of the housing parallel with the shaftway and adjacent the open bay area. A pair of closure plates are arranged to close the opposite ends of the shaftway and the bay area which are connected to and close the ends of the longitudinally extending members. A plurality of gusset plates join the adjacent ends of the longitudinally extending members at the periphery of the closure plates and leave a major portion of the shaftway and the bay area accessible between the longitudinally extending members.

Further, the present invention provides an automated data library comprising a plurality of storage means each arranged to accept and store a data storage member, a reading device arranged to retrieve data from a data storage member, and transport means arranged to selectively transfer data storage members between the storage means and the reading device, A housing is provided for the assembly which has a generally centrally disposed shaftway accommodating the movement of the transport means and a pair of generally open bay areas opening into and extending along opposite sides of the shaftway. The bay areas are arranged to house the plurality of storage means and the reading device therein for access thereto by the transport means. The improvement comprises means forming the housing as a substantially rigid lightweight structure providing accurate location of the components therein. The housing structure comprises a plurality of longitudinally extending members disposed about and parallel to the shaftway and the bay areas, with at least one of the longitudinally extending members being formed as a closed longitudinal member and the remaining longitudinally extending members being open along one side and disposed at the corners of the housing parallel with the shaftway and adjacent the open bay areas. A pair of closure plates are arranged to close the opposite ends of the shaftway and the bay areas and connect to and close the ends of the longitudinally extending members. A plurality of triangular strengthening plates are joined to the adjacent ends of the longitudinally extending members and to the periphery of the closure plates, leaving a major portion of the shaftway and the bay areas accessible between the longitudinally extending members. The closed longitudinal member forms a housing for a longitudinally movable counterweight for the transport means, and at least a portion of the surfaces of the longitudinally extending members facing the shaftway form guiding surfaces for the transport means. At least a portion of the surfaces of the longitudinally extending members facing the bay areas form mounting surfaces for the storage means and the reading device.

Various means for practicing the invention and other features and advantages thereof will be apparent from the following detailed description of an illustrative preferred embodiment of the invention, reference being made to the accompanying drawings.

DETAILED DESCRIPTION OF THE PREFERRED EMBODIMENT

Figure 1:
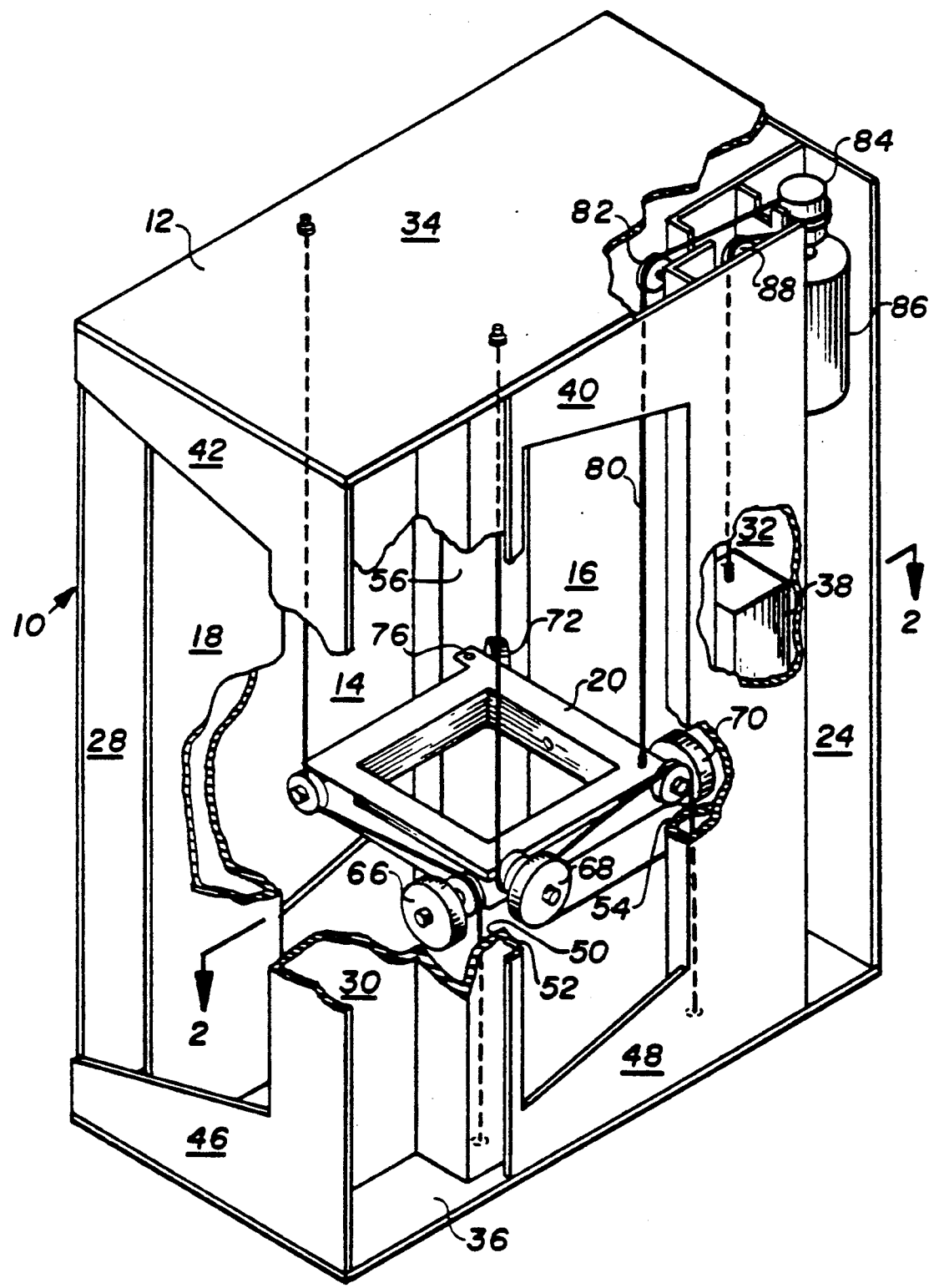
FIG. 1 is a perspective view of a preferred embodiment of the present invention illustrating an automated disk library assembly, with portions thereof cut away.
Figure 2:
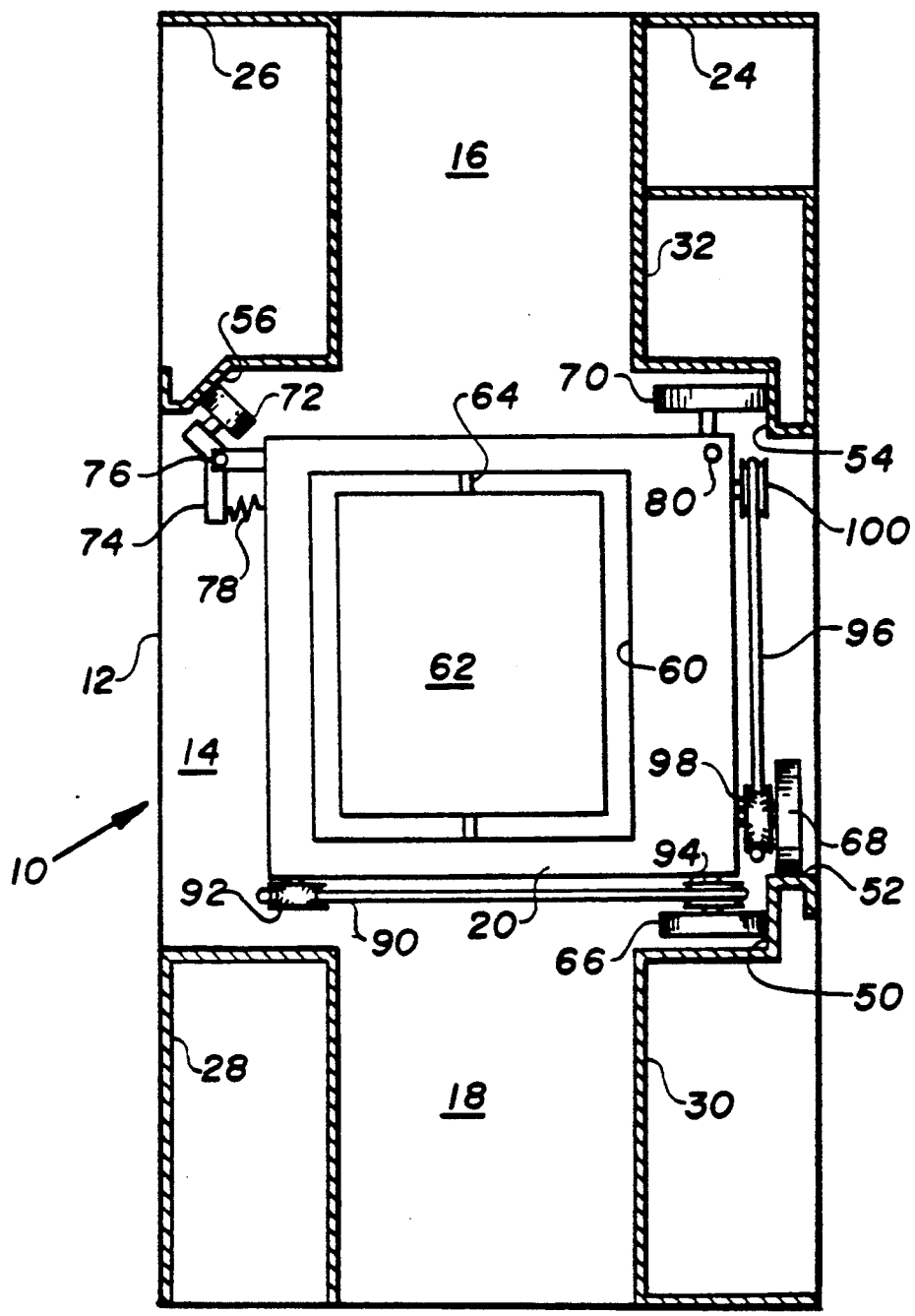
FIG. 2 is a horizontal sectional view taken through the assembly along lines 2—2 of FIG. 1.

Referring now to FIGS. 1 and 2, a preferred embodiment of a housing 12 for an automated data library 10 is illustrated. The library assembly consists of a generally centrally disposed shaftway 14 extending vertically through the center of the housing. A pair of generally open bay areas 16 and 18 are arranged on opposite sides of, and open into the shaftway 14. The bay areas are arranged to locate and support a plurality of storage racks (not shown) which are each arranged to support individual disks and disk carriers in closely spaced vertical stacks arranged with the disks in a horizontal plane. The storage racks are of the type commonly known in the art and are arranged to support the disks and disk carriers so as to be accessible from the shaftway 14. At least one of the bay areas is also arranged to support and locate at least one disk drive arranged to receive a disk and disk carrier delivered from the shaftway, all in a manner generally known to the art. A disk transport means comprising a carriage 20 is disposed in the shaftway for vertical movement therein and for access to each of the disk carriers, with the associated disk, disposed in the storage racks within the bay areas 16 and 18, as well as to the disk drives also located therein.

The assembly housing 12 is constructed of sheet metal which has sufficient stiffness and rigidity to provide the structural integrity to withstand the forces imparted upon the assembly during assembly, shipping and operation. However, it is also constructed to provide the necessary access to the interior thereof for assembly and for service without compromising the structural integrity and rigidity thereof. This is necessary so that the forces imparted to the structure under the foregoing conditions do not deflect or distort the structure in a manner which will compromise or change the positional alignments between the various components therein so that the apparatus can operate as intended, without elaborate repositioning or readjustment necessary. The housing comprises a plurality of longitudinally extending members disposed about and parallel to the shaftway and bay areas. The longitudinally extending members comprise a plurality of generally C-shaped or U-shaped channel members 24, 26, 28, and 30 which are open along one side and arranged at each of the corners of the housing structure. The channel members are arranged to provide rigidity to the structure as well as mounting space for various other components of the assembly. A generally square or rectangular tubular member 32, i.e. a closed longitudinal member is also provided adjacent to one corner of the assembly which, along with channel members 24–30, is structurally connected at the ends thereof to top and bottom housing plate members 34 and 36, respectively. By virtue of the tubular nature of element 32, i.e. the fact that it has a closed cross-section, and the fact that the ends of the tube are structurally closed by the top and bottom plate members 34 and 36, i.e. the shape of the cross section of the tube is prevented from changing shape by the connection of the ends of the tube to the plate members, whether or not the tube ends are actually closed, the tube imparts significant torsional stiffness to the overall housing assembly. This stiffness is enhanced by the relatively large volume occupied by the tubular element 32, and yet the space therein is functionally useful for providing a shaftway for a carriage counterweight 38. A plurality of generally triangular gusset plates including 40, 42, 46 and 48 are disposed about and joined to the adjacent edges of the closure plates 34 and 36 to prevent flexural deflection of the closure plates. The gusset plates also enhance the torsional stiffness of the overall housing assembly by connecting the four vertical corner channels so that they combine to effectively form a large tube. While they provide the requisite stiffness to the housing assembly, the gusset plates do not entirely enclose either the shaftway or the bay areas, so that they are still substantially open to permit assembly and service.

The inner faces of longitudinal channel members 26 and 30, and tubular member 32, i.e., those facing the shaftway 14, are provided with guide surfaces for the transport means. Channel member 30 is provided with guide surfaces 50 and 52 which are mutually perpendicular and which extend the length of the shaftway. Tubular member 32 is provided with guide surface 54 which is parallel with guide surface 50, and channel member 26 is provided with guide surface 56 which is angled with respect to guide surfaces 50, 52 and 54, in a manner to be more thoroughly described hereinbelow.

The transport carriage 20 is a substantially rectangular member disposed horizontally for vertical movement in shaftway 14. The carriage is provided with a substantially rectangular generally centrally disposed opening 60, within which a rotor 62 is mounted for rotation about a shaft 64, connecting it to the carriage 60. Means (not shown) is provided for rotating the rotor so that either side of a transported disk may be presented to the disk drive, in a manner well known in the art. While not a part of the present invention, the rotor 62 has a width and length substantially equal to that of the disk carrier and is provided with means, also known in the art, to engage a disk carrier located in a storage device in bay 16 or 18, or in a disk drive, and to transport the disk carriage and the disk contained therein onto the rotor for transfer to another location in the assembly. At that point, the rotor is provided with means for discharging the disk carrier to a storage location or to a disk drive, in a manner well known in the art.

The carriage is provided with four rollers rotatably mounted on the carriage which engage the guide surfaces 50-56 of the housing, substantially as disclosed in the above-identified copending application Ser. No. 508,035 now U.S. Pat. No. 5,060,211, to locate the carriage with respect to the x- and the y-axes. The fourth roller 72 is spring-loaded into engagement with the angled guide surface 56 which produces a force on the carriage which seats the three guide rollers securely against the respective guide surfaces, thereby accurately and simply locating the carriage with respect to the x-axis, the y-axis, and with respect to rotation about the z-axis.

The carriage is located and moved along the z-axis by a drive cable 80 which is connected to a corner of the carriage adjacent third guide roller 70. The drive cable extends upwardly to the top of the assembly housing where it passes over a guide pulley 82 and then horizontally to wrap several turns about a drive pulley 84 on the upper end of vertically mounted motor 86. After leaving the drive pulley 84, the drive cable passes over a second pulley 88 and down to connect with the counterweight 38. The motor is bi-directional and can be selectively operated to raise or lower the carriage, as desired.

It will thus be seen that the present invention provides an automated data library which provides the requisite rigidity and stiffness without excessive bulk or weight and which provides a media transport means which is capable of rapid and easy movement without requiring high precision components which increase both cost and the complexity of the device.

As a result of the simplicity of the housing construction, the quantity of data that may be stored therein is significantly increased for a given volume. For example, an automated data library constructed according to the present invention and having a size approximating that of a standard two-drawer file cabinet, can contain from 40-61, 5.25-inch optical disks and from 1-5 optical disk drives. Such a device would have a capacity of 75 gigabytes, or approximately 10 million pages of written data, in a floor area of under 3 square feet. Moreover, the present arrangement provides simpler manufacturing, improved reliability and lower maintenance requirements, all of which significantly add to the economic advantages of the assembly.

The invention has been described with reference to specific embodiments and variations, but it should be apparent that other modifications and variations can be made within the spirit and scope of the invention, which is defined by the following claims.

What is claimed is:

1. In an automated data library comprising a plurality of storage means each arranged to accept and store a data storage member, a reading device arranged to retrieve data from a data storage member, and transport means arranged to selectively transfer data storage members between said storage means and said reading device, a housing for said assembly forming a generally centrally disposed shaftway accommodating the movement of said transport means and at least one generally open bay area opening into and extending along said shaftway, said bay area being arranged to locate said plurality of storage means and said reading device therein for access thereto by said transport means, the improvement comprising means forming said housing as a substantially rigid lightweight structure providing accurate location of the components therein, said structure comprising a plurality of longitudinally extending members disposed about and parallel to said shaftway and said bay area, at least one of said longitudinally extending members being formed as a rigid closed longitudinal member and the remaining longitudinally extending members being open along one side and disposed at the corners of said housing parallel with said shaftway and adjacent said open bay areas, a pair of closure plates arranged to close the opposite ends of said shaftway and said bay area and connected to and closing ends of said longitudinally extending members, a plurality of triangular strengthening plates joining the adjacent ends of said longitudinally extending members at the periphery of said closure plates and leaving a major portion of said shaftway and said bay area accessible between said longitudinally extending members, said closed longitudinal member forming a housing for a longitudinally movable counterweight for said transport means, at least a portion of the surfaces of said longitudinally extending members facing said shaftway forming guiding surfaces for said transport means, and at least a portion of the surfaces of said longitudinally extending members facing said bay area forming mounting surfaces for said storage means and said reading device.

2. An automated data library according to claim 1 wherein a pair of generally open bay areas opening into and extending along said shaftway are disposed on opposite sides of said shaftway.

* * * * *